(12) United States Patent
Takabayashi

(10) Patent No.: US 11,372,666 B2
(45) Date of Patent: Jun. 28, 2022

(54) REDUNDANT SYSTEM, REDUNDANT PROGRAM, AND INFORMATION PROCESSING APPARATUS

(71) Applicant: YOKOGAWA ELECTRIC CORPORATION, Tokyo (JP)

(72) Inventor: Yuji Takabayashi, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 154 days.

(21) Appl. No.: 16/564,204

(22) Filed: Sep. 9, 2019

(65) Prior Publication Data
US 2020/0081730 A1 Mar. 12, 2020

(30) Foreign Application Priority Data
Sep. 10, 2018 (JP) .............................. JP2018-169162

(51) Int. Cl.
*G06F 9/455* (2018.01)
*G06F 11/20* (2006.01)

(52) U.S. Cl.
CPC ...... *G06F 9/45558* (2013.01); *G06F 11/2035* (2013.01); *G06F 11/2048* (2013.01);
(Continued)

(58) Field of Classification Search
CPC ............. G06F 9/45558; G06F 11/2048; G06F 11/2035; G06F 2009/45575; G06F 2009/45591; G06F 2009/45595
See application file for complete search history.

(56) References Cited

U.S. PATENT DOCUMENTS

2012/0330898 A1* 12/2012 Bk .......................... G06F 16/13
707/659
2014/0089447 A1* 3/2014 Uchida ............... H04L 67/1097
709/212
(Continued)

FOREIGN PATENT DOCUMENTS

JP 4099816 B2 6/2008
JP 4468426 B2 5/2010

*Primary Examiner* — Dong U Kim
(74) *Attorney, Agent, or Firm* — Sughrue Mion, PLLC

(57) ABSTRACT

A redundant system (1) includes information processing apparatuses (10), each of which includes a communication interface (11) that communicates with another information processing apparatus (10) and a controller (13) that manages virtual environments capable of running on the respective information processing apparatus (10). The communication interface (11) transmits first equalization information associated with a first environment, among the virtual environments, in an operating state to the other information processing apparatus (10). The communication interface (11) receives second equalization information associated with a second environment in the operating state on the other information processing apparatus (10) from the other information processing apparatus (10). The controller (13) equalizes the second environment onto the respective information processing apparatus (10) based on the second equalization information received by the communication interface (11). The controller (13) maintains the first environment in the operating state and sets the second environment to a standby state.

11 Claims, 11 Drawing Sheets

(52) U.S. Cl.
CPC .............. *G06F 2009/45575* (2013.01); *G06F 2009/45591* (2013.01); *G06F 2009/45595* (2013.01)

(56) References Cited

U.S. PATENT DOCUMENTS

2015/0074447 A1\* 3/2015 Park .................... G06F 9/45558
714/4.11
2016/0283251 A1\* 9/2016 Enomoto ............ G06F 11/2097

\* cited by examiner

FIG. 4
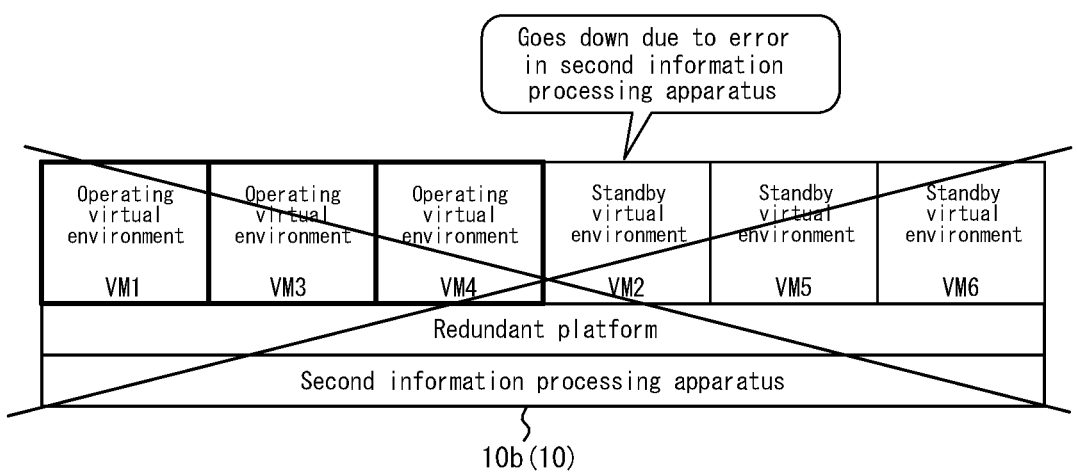
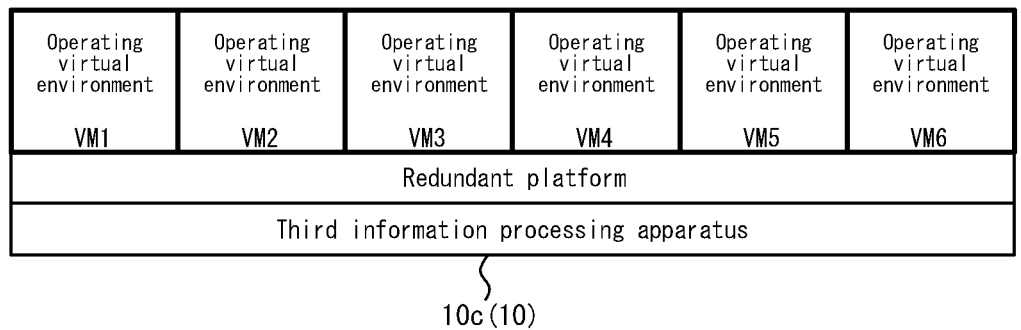

REDUNDANT SYSTEM, REDUNDANT PROGRAM, AND INFORMATION PROCESSING APPARATUS

CROSS-REFERENCE TO RELATED APPLICATION

The present application claims priority to and the benefit of Japanese Patent Application No. 2018-169162 filed Sep. 10, 2018, the entire contents of which are incorporated herein by reference.

TECHNICAL FIELD

The present disclosure relates to a redundant system, a redundant program, and an information processing apparatus.

BACKGROUND

Among systems that include two information processing apparatuses, a known technique related to redundancy can switch operations to the other information processing apparatus when a fatal error occurs in one information processing apparatus, allowing system operations to continue without being affected.

For example, patent literature (PTL) 1 discloses a redundant controller that can be implemented on a general-purpose operating system (OS) and hardware, without requiring a special OS that has a redundant control mechanism or special hardware.

PTL 2, for example, discloses a high-availability system that achieves duality by combining virtual computers respectively running on two independent computers.

CITATION LIST

Patent Literature

PTL 1: JP4099816B2
PTL 2: JP4468426B2

SUMMARY

A redundant system according to an embodiment includes a plurality of information processing apparatuses. Each information processing apparatus includes a communication interface configured to communicate with another information processing apparatus, and a controller configured to manage a plurality of virtual environments capable of running on the respective information processing apparatus. The communication interface is configured to transmit first equalization information associated with a first environment, among the plurality of virtual environments, that is in an operating state to the other information processing apparatus, and receive second equalization information associated with a second environment in the operating state on the other information processing apparatus from the other information processing apparatus. The controller is configured to equalize the second environment onto the respective information processing apparatus based on the second equalization information received by the communication interface. The controller is also configured to maintain the first environment in the operating state and set the second environment to a standby state.

BRIEF DESCRIPTION OF THE DRAWINGS

In the accompanying drawings:

FIG. 4 schematically illustrates operations of the redundant system when, as an example, the second information processing apparatus of FIG. 3 goes down;

DETAILED DESCRIPTION

Figure 1:
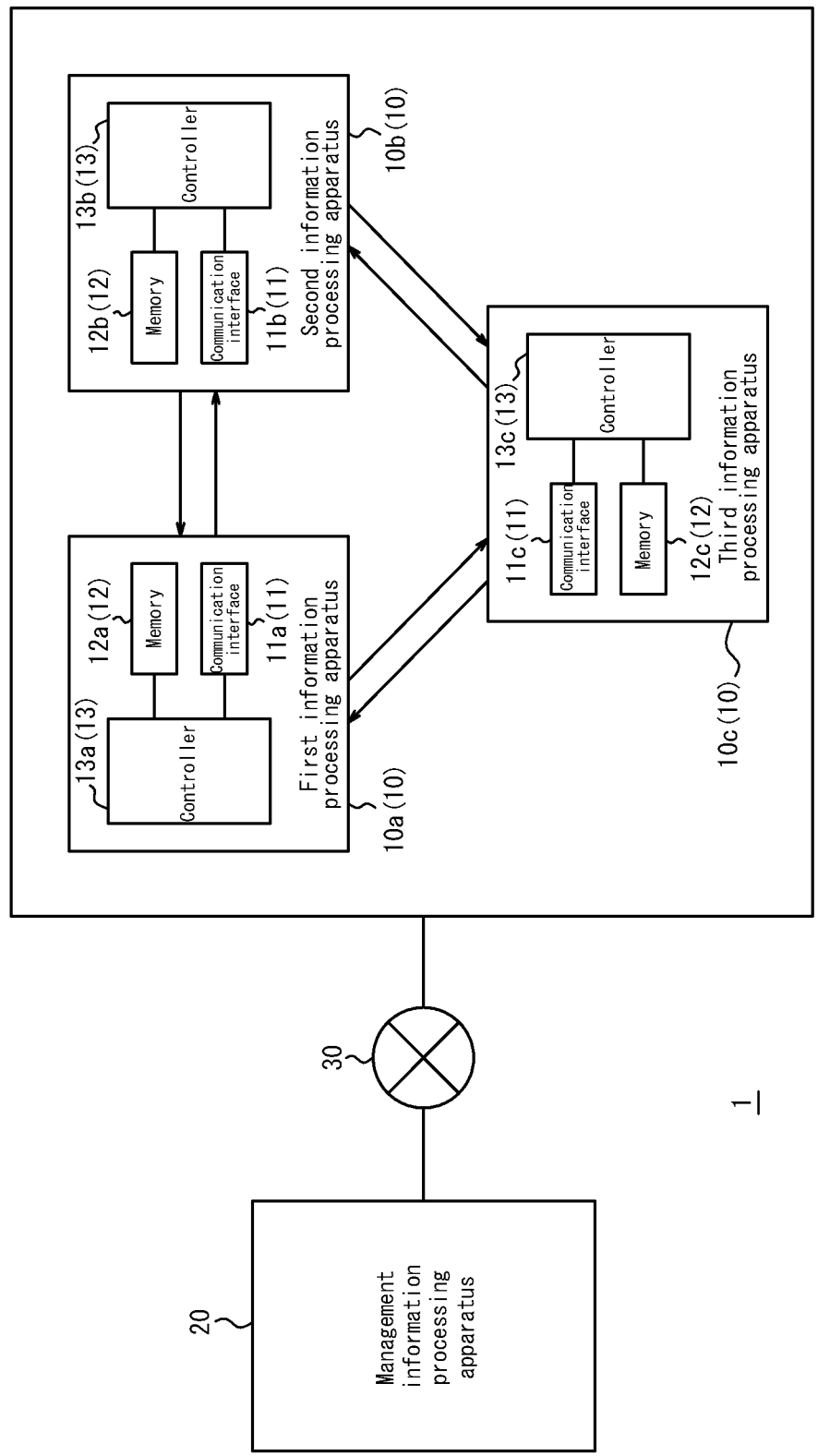
FIG. 1 is a block diagram illustrating an example of a redundant system according to an embodiment.

Innovations in information processing have progressed at an amazing speed in recent years. Demand exists for systems that can flexibly change, such as by expanding in scale, in response to changes in the external environment without suspending the system and that have better reliability and availability. The systems disclosed in PTL 1 and PTL 2 do not take these points into sufficient consideration.

It is an object of the present disclosure to provide a redundant system, a redundant program, and an information processing apparatus that can flexibly change the system scale and that have better reliability and availability.

A redundant system according to an embodiment includes a plurality of information processing apparatuses. Each information processing apparatus includes a communication interface configured to communicate with another information processing apparatus and a controller configured to manage a plurality of virtual environments capable of running on the respective information processing apparatus. The communication interface is configured to transmit first equalization information associated with a first environment, among the plurality of virtual environments, that is in an operating state to the other information processing apparatus and receive second equalization information associated with a second environment in the operating state on the other information processing apparatus from the other information processing apparatus. The controller is configured to equalize the second environment onto the respective information processing apparatus based on the second equalization information received by the communication interface. The controller is also configured to maintain the first environment in the operating state and set the second environment to a standby state. A new information processing apparatus can therefore be added to the redundant system more easily than in a known redundant system in which the hardware has a fixed configuration that includes a pair of two information processing apparatuses; with one information processing apparatus in the operating state and the other in the standby state. Accordingly, the redundant system can flexibly change, such as by expanding in scale, in response to technological advances and changes in the external environment, without suspending the system. The redundant system also has better reliability and availability.

The redundant system according to an embodiment may include three of the information processing apparatuses, the first environment may include one virtual environment, and the second environment may include two virtual environments in the operating state respectively on two other information processing apparatuses. One virtual environment running on each information processing apparatus is therefore equalized onto the two other information processing apparatuses. Accordingly, the reliability and availability are even better than when the virtual environment is equalized onto only one other information processing apparatus.

In the redundant system according to an embodiment, when the controller judges that other information processing apparatus is down, the controller may be configured to switch the second environment that was in the operating state on the other information processing apparatus from the standby state to the operating state. Consequently, if another information processing apparatus goes down due to a hardware error, for example, operations instantaneously switch to the respective information processing apparatus. Accordingly, system operations can continue without suffering any effect whatsoever.

In the redundant system according to an embodiment, when the controller judges that a new information processing apparatus is added to the redundant system, the controller may be configured to transmit the first equalization information associated with the first environment in the operating state to the new information processing apparatus using the communication interface. The controller may also be configured to delete the first environment associated with the transmitted first equalization information. The system configuration can therefore be changed without suspending operation of the system. To further improve the availability of the system, and to further improve system performance, a new information processing apparatus may be added while the system is operating, thereby dispersing the load and improving reliability and availability.

In the redundant system according to an embodiment, the communication interface may be configured to transmit and receive information using a remote direct memory access function implemented on a LAN card. Equalization onto another information processing apparatus can therefore be achieved without software-based processing. Accordingly, the overhead for equalization is greatly reduced, and equalization is achieved at high speed.

The redundant system according to an embodiment may include two information processing apparatuses, the first environment may include one virtual environment, and the second environment may include a virtual environment in the operating state on one other information processing apparatus. The virtual environment running on each information processing apparatus is therefore equalized onto the other information processing apparatus as a virtual environment in the standby state. Accordingly, the aggregation rate can be improved compared to a known dual system in which one information processing apparatus is in the operating state and the other information processing apparatus is in the standby state. The aggregation rate is the ratio of the number of virtual environments in the operating state to the number of information processing apparatuses included in the redundant system. For example, when one virtual environment in the operating state is established on one information processing apparatus, the aggregation rate is 50% in a known dual system. Conversely, in the redundant system according to an embodiment, one virtual environment can run on each of two information processing apparatuses that achieve redundancy. The aggregation rate is therefore 100%. Additionally, the load balance changes on each information processing apparatus. In other words, the load becomes substantially uniform on each information processing apparatus, improving the load balance.

The redundant system according to an embodiment may include three information processing apparatuses, the first environment may include two virtual environments, and the second environment may include two virtual environments in the operating state respectively on two other information processing apparatuses. Two virtual environments running on each information processing apparatus are therefore equalized onto the two other information processing apparatuses. Accordingly, the redundant system can flexibly change, such as by expanding in scale, in response to technological advances and changes in the external environment, without suspending the system. The redundant system can do so even when a plurality of virtual environments is in the operating state on each information processing apparatus. The redundant system also has better reliability and availability.

The redundant system according to an embodiment may further include a management information processing apparatus. The management information processing apparatus may change redundant management information based on an input operation from a user and transmit the redundant management information to each information processing apparatus among the plurality of information processing apparatuses. The configuration of the information processing apparatuses included in the redundant system, the association with the virtual environments for each information processing apparatus, and the association with the operating state or the standby state for the virtual environments on each information processing apparatus can therefore be adjusted freely. Accordingly, the configuration can be freely changed in the redundant system without suspending operations.

A redundant program according to an embodiment is a redundant program for running on a plurality of information processing apparatuses included in a redundant system. The redundant program includes transmitting first equalization information, associated with a first environment in an operating state on each information processing apparatus among the plurality of information processing apparatuses, from the information processing apparatus to another information processing apparatus; receiving, using the information processing apparatus, second equalization information from the other information processing apparatus, the second equalization information being associated with a second environment in the operating state on the other information processing apparatus; equalizing the second environment onto the information processing apparatus based on the received second equalization information; and maintaining the first environment in the operating state and setting the second environment to a standby state on the information processing apparatus. A new information processing apparatus can therefore be added to the redundant system more easily than in a known redundant system in which the hardware has a fixed configuration that includes a pair of two information processing apparatuses, with one information processing apparatus in the operating state and the other in the standby state. Accordingly, the redundant system can flexibly change, such as by expanding in scale, in response to technological advances and changes in the external environment, without suspending the system. The redundant system also has better reliability and availability.

The redundant program according to an embodiment may run on three of the information processing apparatuses included in the redundant system, the first environment may include one virtual environment, and the second environment may include two virtual environments in the operating state respectively on two other information processing apparatuses. One virtual environment running on each information processing apparatus is therefore equalized onto the two other information processing apparatuses. Accordingly, the reliability and availability are even better than when the virtual environment is equalized onto only one other information processing apparatus.

The redundant program according to an embodiment may further include judging whether another information processing apparatus is down; and switching, when it is judged that the other information processing apparatus is down, the second environment that was in the operating state on the other information processing apparatus from the standby state to the operating state on the information processing apparatus. Consequently, if another information processing apparatus goes down due to a hardware error, for example, operations instantaneously switch to the respective information processing apparatus. Accordingly, system operations can continue without suffering any effect whatsoever.

The redundant program according to an embodiment may further include judging whether a new information processing apparatus is added to the redundant system; transmitting, when it is judged that a new information processing apparatus is added, the first equalization information associated with the first environment in the operating state on the information processing apparatus to the new information processing apparatus; and deleting the first environment associated with the transmitted first equalization information from the information processing apparatus. The system configuration can therefore be changed without suspending operation of the system. To further improve the availability of the system, and to further improve system performance, a new information processing apparatus may be added while the system is operating, thereby dispersing the load and improving reliability and availability.

In the redundant program according to an embodiment, information may be transmitted and received using a remote direct memory access function implemented on a LAN card. Equalization onto another information processing apparatus can therefore be achieved without software-based processing. Accordingly, the overhead for equalization is greatly reduced, and equalization is performed at high speed.

The redundant program according to an embodiment may run on two of the information processing apparatuses included in the redundant system, the first environment may include one virtual environment, and the second environment may include one virtual environment in the operating state on one other information processing apparatus. The virtual environment running on each information processing apparatus is therefore equalized onto the other information processing apparatus as a virtual environment in the standby state. Accordingly, the aggregation rate can be improved compared to a known dual system in which one information processing apparatus is in the operating state and the other information processing apparatus is in the standby state. The aggregation rate is the ratio of the number of virtual environments in the operating state to the number of information processing apparatuses included in the redundant system. For example, when one virtual environment in the operating state is established on one information processing apparatus, the aggregation rate is 50% in a known dual system. Conversely, in the redundant system according to an embodiment, one virtual environment can run on each of two information processing apparatuses that achieve redundancy. The aggregation rate is therefore 100%. Additionally, the load balance changes on each information processing apparatus. In other words, the load becomes substantially uniform on each information processing apparatus, improving the load balance.

The redundant program according to an embodiment may run on three of the information processing apparatuses included in the redundant system, the first environment may include two virtual environments, and the second environment may include two virtual environments in the operating state respectively on two other information processing apparatuses. Two virtual environments running on each information processing apparatus are therefore equalized onto the two other information processing apparatuses. Accordingly, the redundant system can flexibly change, such as by expanding in scale, in response to technological advances and changes in the external environment, without suspending the system. The redundant system can do so even when a plurality of virtual environments is in the operating state on each information processing apparatus. The redundant system also has better reliability and availability.

The redundant program according to an embodiment may also run on a management information processing apparatus included in the redundant system and may further include receiving an input operation from a user on the management information processing apparatus; changing redundant management information based on the input operation from a user; and transmitting the redundant management information to each information processing apparatus among the plurality of information processing apparatuses. The configuration of the information processing apparatuses included in the redundant system, the association with the virtual environments for each information processing apparatus, and the association with the operating state or the standby state for the virtual environments on each information processing apparatus can therefore be adjusted freely. Accordingly, the configuration can be freely changed in the redundant system without suspending operations.

An information processing apparatus according to an embodiment is an information processing apparatus among a plurality of information processing apparatuses configuring a redundant system. The information processing apparatus includes a communication interface configured to communicate with another information processing apparatus different from the information processing apparatus, and a controller configured to manage a plurality of virtual environments capable of running on the information processing apparatus. The communication interface is configured to transmit first equalization information associated with a first environment, among the plurality of virtual environments, that is in an operating state to the other information processing apparatus, and receive second equalization information associated with a second environment in the operating state on the other information processing apparatus from the other information processing apparatus. The controller is configured to equalize the second environment onto the information processing apparatus based on the second equalization information received by the communication interface. The controller is also configured to maintain the first environment in the operating state and set the second environment to a standby state. A new information processing apparatus can therefore be added to the redundant system more easily than in a known redundant system in which the hardware has a fixed configuration that includes a pair of two information processing apparatuses, with one information processing apparatus in the operating state and the other in the standby state. Accordingly, the redundant system can flexibly change, such as by expanding in scale, in response to technological advances and changes in the external environment without suspending the system. The redundant system also has better reliability and availability.

The present disclosure can provide a redundant system, a redundant program, and an information processing apparatus that can flexibly change the system scale and that have better reliability and availability.

Figure 11:
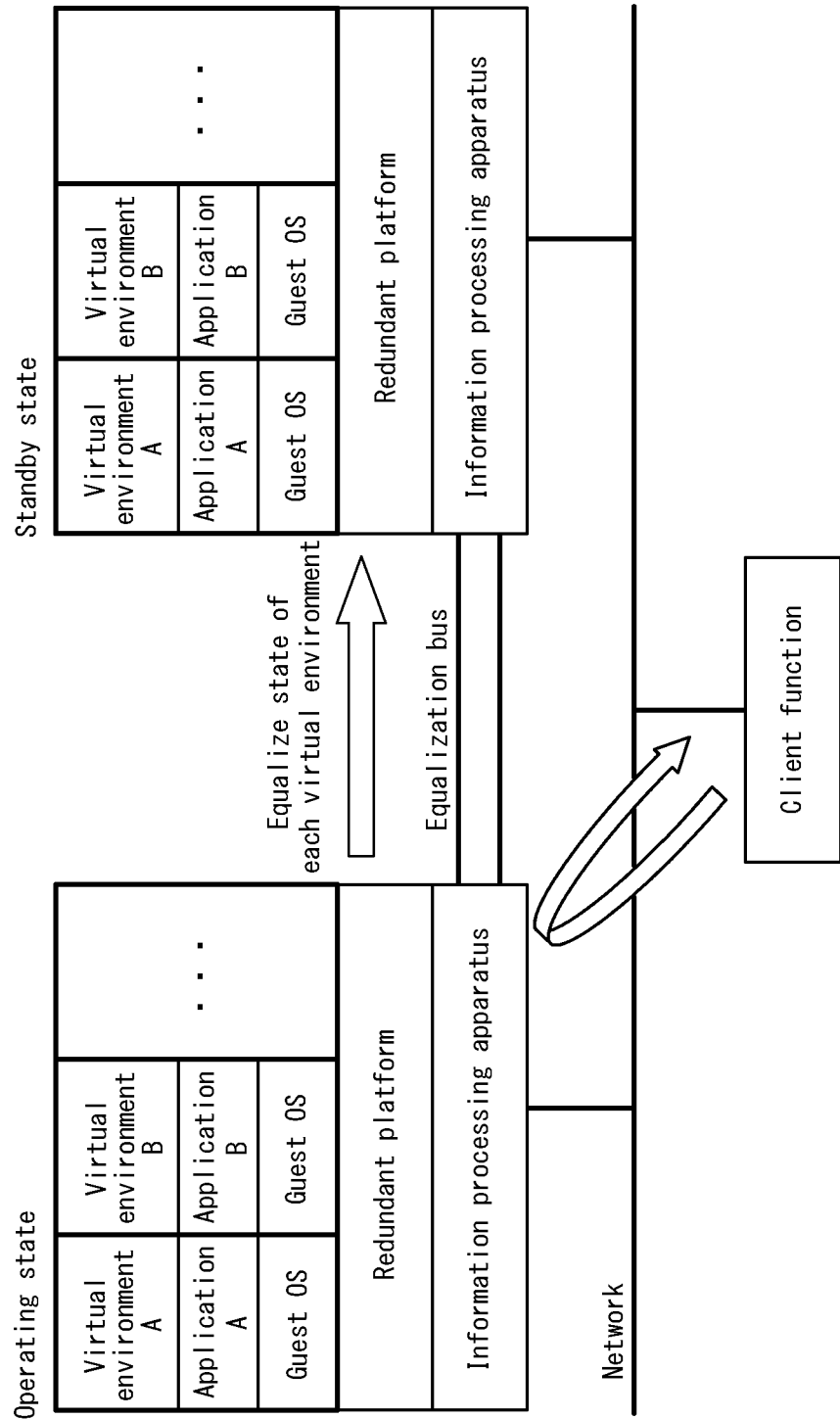
FIG. 11 schematically illustrates an example of a known redundant system.

FIG. 11 schematically illustrates an example of a known redundant system. This known technique and the problems thereof are described in greater detail with reference to FIG. 11.

A fault tolerant redundant system, for example, is known. The "fault tolerant redundant system" includes a redundant system that can switch operations to another information processing apparatus when a fatal error occurs in one information processing apparatus, allowing system operations to continue without being affected whatsoever. The redundant system can operate without modification of a commercially available OS, application software, and the like.

The known redundant system includes two information processing apparatuses. Each information processing apparatus manages one or more virtual environments. In greater detail, a redundant platform on the information processing apparatus has a hypervisor function and provides a virtual hardware environment. A guest OS and application software run on one virtual hardware environment.

In the known redundant system, a plurality of virtual environments run on the redundant platform, thereby making the consolidation of functions compatible with high reliability and availability. Additionally, a redundant system that is not dependent on the OS or application software can be achieved. This known redundant system can therefore be applied to systems in various fields to create systems with high reliability and availability. Furthermore, the entire virtual environment is the target of redundancy in this known redundant system. A fault tolerant redundant system can therefore be achieved.

In the known redundant system, one information processing apparatus is in an operating state, and the other information processing apparatus is in a standby state. Software in the virtual environments runs on the information processing apparatus in the operating state. By an equalization function of one information processing apparatus, changes to a virtual environment of the one information processing apparatus are consecutively equalized, over an equalization bus, onto the corresponding virtual environment of the other information processing apparatus that is in the standby state. The "changes to the virtual environment" include, for example, writing to memory and to each device or the like.

The virtual environments on the other information processing apparatus in the standby state are always maintained in the same state as the corresponding virtual environments on the one information processing apparatus. When a fault occurs in the one information processing apparatus, the one information processing apparatus is isolated by a control switching function of the other information processing apparatus, and all of the virtual environments on the other information processing apparatus are switched to the operating state. Consequently, operations of the virtual environments that were running on the one information processing apparatus are continued on the other information processing apparatus.

In such a known redundant system, the hardware configuration is fixed by a pair of two information processing apparatuses. It is therefore difficult to obtain greater availability than the availability obtainable by two information processing apparatuses. Furthermore, a known redundant system can handle a fault in one information processing apparatus but cannot handle faults in two information processing apparatuses.

Since the hardware configuration is fixed by a pair of two information processing apparatuses in a known redundant system, it is difficult to dynamically expand the scale of the redundant system as the system grows. It is also difficult to flexibly change the system configuration, for example by adding hardware, as the application volume and data volume increase.

The architecture of a known redundant system allows a plurality of virtual environments to run on one information processing apparatus. The amount of data related to equalization increases, however, and performance degrades. It is therefore difficult to run a large number of virtual environments. Although the scale of the application software to be executed is a factor, approximately two virtual environments can realistically run on one information processing apparatus. This makes it difficult to increase the aggregation rate, preventing a decrease in system costs. The "aggregation rate" is the ratio of the number of virtual environments in the operating state to the number of information processing apparatuses included in the redundant system.

Innovations such as the Internet of Things (IoT) and Artificial Intelligence (AI) have progressed at an amazing speed in recent years. An extremely strong demand has developed for control systems that incorporate these innovations to improve production efficiency and achieve safe, stable operations. These circumstances have increased the importance of host systems in which information processing apparatuses, including personal computers or the like, are used. Demand therefore exists for systems that can flexibly change, such as by expanding in scale, in response to technological advances and changes in the external environment, without suspending the system and that have better reliability and availability.

To address these problems, it is an object of the present disclosure to provide a redundant system, a redundant program, and an information processing apparatus that can flexibly change the system scale and that have better reliability and availability. A redundant system and redundant program according to an embodiment of the present disclosure are, for example, applicable to a fault tolerant redundant system.

Embodiments of the present disclosure are described below with reference to the drawings.

FIG. 1 is a block diagram illustrating an example of a redundant system 1 according to an embodiment. For example, the redundant system 1 includes a first information processing apparatus 10a, a second information processing apparatus 10b, a third information processing apparatus 10c, and a management information processing apparatus 20, as illustrated in FIG. 1. The first information processing apparatus 10a, second information processing apparatus 10b, and third information processing apparatus 10c are collectively referred to below as the "information processing apparatus 10" when not distinguishing therebetween. The information processing apparatuses 10 are communicably connected to the management information processing apparatus 20 over a network 30. The information processing apparatuses 10 are communicably connected to each other by any type of inter-pair communication. Such inter-pair communication may be performed independently of the network 30 or over the network 30.

The network 30 may include any appropriate network, such as the Internet or a local area network. The network 30 may be wired, wireless, or a combination thereof.

The management information processing apparatus 20 may include any information processing apparatus capable of managing the information processing apparatuses 10 over the network 30. The management information processing apparatus 20 may be a dedicated information processing apparatus specialized in management of the information processing apparatuses 10 over the network 30 or may be any general-purpose electronic device, such as a cellular phone, a smartphone, a tablet PC, a desktop computer, or a mobile computer.

The management information processing apparatus 20 may, for example, configure the redundant platform operating on the information processing apparatuses 10 by editing settings, downloading information, and the like. The management information processing apparatus 20 may, for example, monitor the operating state of the virtual environments running on the information processing apparatuses 10. The management information processing apparatus 20 may, for example, transmit operation commands to the information processing apparatuses 10. The operation commands include launching, suspending, and changing the operating state of a virtual environment. The management information processing apparatus 20 may, for example, define the virtual environments associated with the information processing apparatuses 10 in the below-described redundant management information.

The management information processing apparatus 20 may monitor the load balance of the plurality of information processing apparatuses 10 communicably connected over the network 30. The management information processing apparatus 20 may adjust the load balance automatically when judging that the load balance of the information processing apparatuses 10 is uneven. For example, when the load of one information processing apparatus 10 among the information processing apparatuses 10 is low, and the load of another information processing apparatus 10 is high, the management information processing apparatus 20 may update the below-described redundant management information so that a virtual environment associated with the other information processing apparatus 10 is associated with the one information processing apparatus 10.

The information processing apparatus 10 may include any information processing apparatuses that have a redundant platform. The information processing apparatus 10 may be a dedicated information processing apparatus specialized for the configuration of the redundant system 1 or may be any general-purpose electronic device, such as a cellular phone, a smartphone, a tablet PC, a desktop computer, or a mobile computer. The information processing apparatuses 10 may have machine power capable of running the below-described plurality of virtual environments.

The first information processing apparatus 10a includes a communication interface 11a, a memory 12a, and a controller 13a. The second information processing apparatus 10b includes a communication interface 11b, a memory 12b, and a controller 13b. The third information processing apparatus 10c includes a communication interface 11c, a memory 12c, and a controller 13c. The communication interface 11a, communication interface 11b, and communication interface 11c are collectively referred to below as the "communication interface 11" when not distinguishing therebetween. The memory 12a, memory 12b, and memory 12c are collectively referred to below as the "memory 12" when not distinguishing therebetween. The controller 13a, controller 13b, and controller 13c are collectively referred to below as the "controller 13" when not distinguishing therebetween.

The communication interface 11 may include any communication interface supporting any communication protocol. The communication interface 11 is communicably connected to the management information processing apparatus 20 over the network 30. The communication interface 11 may further include any communication interface supporting any inter-pair communication protocol. One communication interface 11 allows the information processing apparatus 10 in which the one communication interface 11 is included to be communicably connected to two other information processing apparatuses 10. The communication interface 11 receives a request, from the controller 13, for equalization onto the other information processing apparatus 10 in the pair and for diagnostic communication and relays the request to the other information processing apparatus 10.

The memory 12 may include any memory device, such as a hard disk drive (HDD), a solid state drive (SSD), an electrically erasable programmable read-only memory (EEPROM), a read-only memory (ROM), a random access memory (RAM), or the like, and stores information necessary for operations of the below-described redundant system 1. The memory 12 may function as a main memory device, an auxiliary memory device, or a cache memory. The memory 12 is not limited to being embedded in the information processing apparatus 10 and may be an attachable memory device connected via a digital input/output port, such as a. USB.

The controller 13 includes one or more processors. In greater detail, the controller 13 may include any processor, such as a general-purpose processor or a dedicated processor specialized for particular processing. The controller 13 may include a processor mounted in a general-purpose electronic device, such as a cellular phone, a smartphone, a tablet PC, a desktop computer, or a mobile computer, or a processor mounted in a dedicated information processing apparatus specialized for the configuration of the redundant system 1. The controller 13 manages a plurality of virtual environments capable of running on the information processing apparatus 10 that includes the controller 13.

Figure 2:
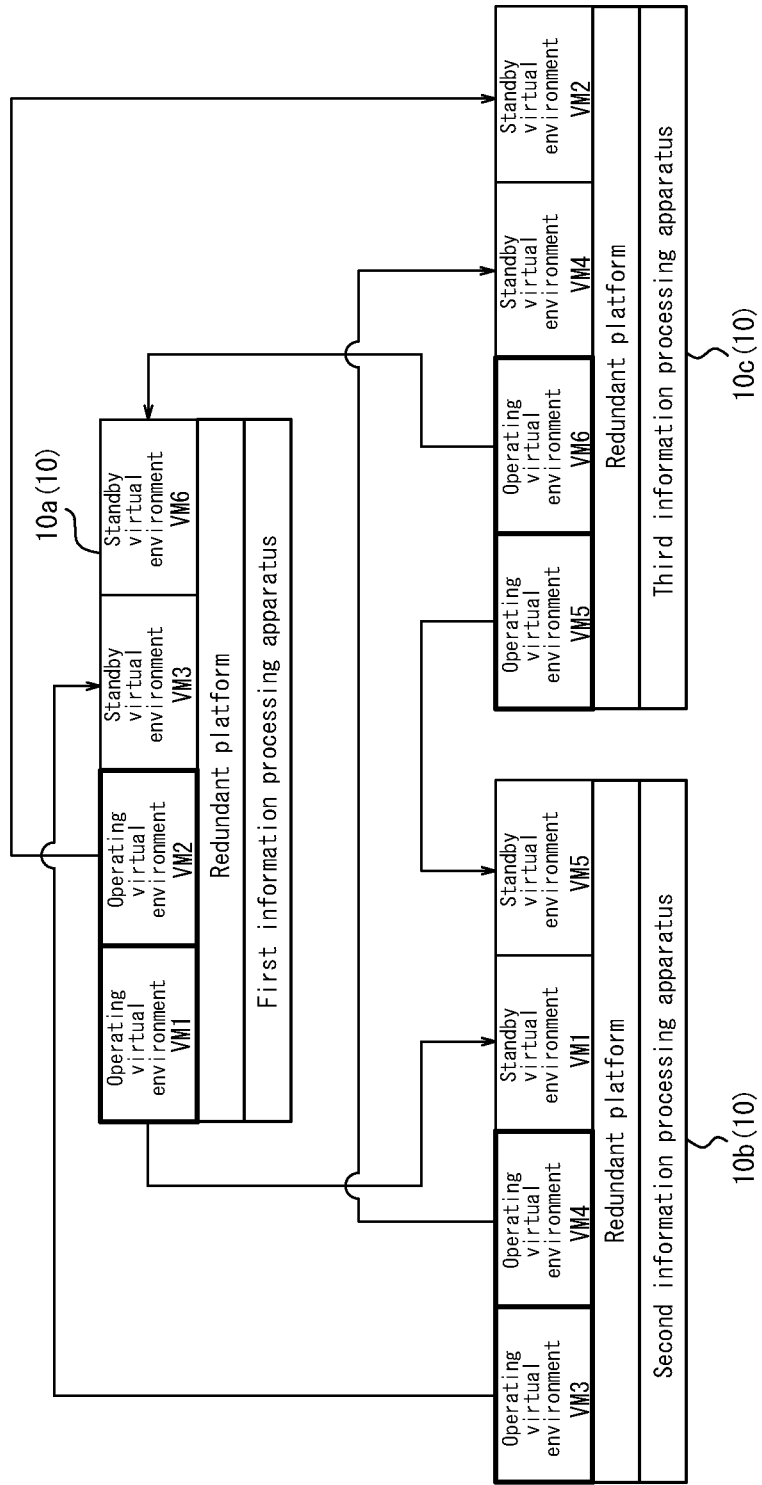
FIG. 2 schematically illustrates a configuration example when two virtual environments are in an operating state on each information processing apparatus of FIG. 1.

FIG. 2 schematically illustrates a configuration example when two virtual environments are in the operating state on each information processing apparatus 10 of FIG. 1. An example of redundant operations in the redundant system 1 is mainly described with reference to FIG. 2. First, the regular operations of the redundant system 1 are mainly described.

In the example in FIG. 2, a redundant platform is configured on each information processing apparatus 10, and four virtual environments are constructed on each redundant platform. Specifically, the four virtual environments VM1, VM2, VM3, VM6 are constructed on the first information processing apparatus 10a. The four virtual environments VM3, VM4, VM1, VM5 are constructed on the second information processing apparatus 10b. The four virtual environments VM5, VM6, VM4, VM2 are constructed on the third information processing apparatus 10c.

The controller 13 downloads redundant management information from the management information processing apparatus 20 via the communication interface 11. Based on the downloaded redundant management information, the controller 13 controls operating virtual environments and standby virtual environments and manages communication for equalization onto other information processing apparatuses 10. The "operating virtual environments" refer to virtual environments in the operating state. The "standby virtual environments" refer to virtual environments in the standby state. The "redundant management information" includes information of the operating virtual environments and the standby virtual environments on the information processing apparatuses 10. When, for example, each information processing apparatus 10 is configured as illustrated in FIG. 2, the redundant management information is defined as a list, as illustrated by Table 1 below. Such redundant management information is, for example, downloaded from the management information processing apparatus 20 and then stored in the memory 12.

differences in any virtual hardware occurring due to the operating virtual environments VM1, VM2 being in the operating state.

The controller 13b of the second information processing apparatus 10b causes the communication interface 11b to receive, from the first information processing apparatus 10a, the equalization information associated with the operating virtual environment VM1 in the operating state on the first information processing apparatus 10a. Based on the equalization information received by the communication interface 11b, the controller 13b equalizes the virtual environment VM1 onto the respective second information processing apparatus 10b.

Similarly, the controller 13c of the third information processing apparatus 10c causes the communication interface 11c to receive, from the first information processing

TABLE 1

| Information Processing | Virtual Environment | | | | | |
| Apparatus | VM1 | VM2 | VM3 | VM4 | VM5 | VM6 |
|---|---|---|---|---|---|---|
| 10a | operating | operating | standby | — | — | standby |
| 10b | standby | — | operating | operating | standby | — |
| 10c | — | standby | — | standby | operating | operating |

Table 1 illustrates the control state of the virtual environments on each information processing apparatus 10. A cell labeled "operating" in Table 1 indicates that the virtual environment on the information processing apparatus 10 is being controlled as an operating virtual environment. A cell labeled "standby" in Table 1 indicates that the virtual environment on the information processing apparatus 10 is being controlled as a standby virtual environment. A cell labeled "-" in Table 1 indicates that the information processing apparatus 10 does not include that virtual environment.

During regular operations of the redundant system 1, the controller 13a of the first information processing apparatus 10a, for example, maintains two virtual environments VM1, VM2 in the operating state. In case the first information processing apparatus 10a goes down, the redundant system 1 equalizes the operating virtual environments VM1, VM2, operating on the first information processing apparatus 10a, onto the other second information processing apparatus 10b and third information processing apparatus 10c. In the example in FIG. 2, the redundant system 1 equalizes the operating virtual environment VM1 onto the second information processing apparatus 10b. The redundant system 1 equalizes the operating virtual environment VM2 onto the third information processing apparatus 10c.

In greater detail, the controller 13a causes the communication interface 11a to transmit equalization information, associated with the operating virtual environments VM1, VM2 in the operating state on the respective first information processing apparatus 10a, to each of the other second information processing apparatus 10b and third information processing apparatus 10c. The "equalization information" includes the differences in the memory content that occur when the state of the operating virtual environments VM1, VM2 changes due to their operation and a write access to the memory area of the virtual environments managed by the redundant platform occurs. The "equalization information" includes an address list acquired when using a remote direct memory access (RDMA) function of a LAN card, described below. The "equalization information" also includes the apparatus 10a, the equalization information associated with the operating virtual environment VM2 in the operating state on the first information processing apparatus 10a. Based on the equalization information received by the communication interface 11c, the controller 13c equalizes the virtual environment VM2 onto the respective third information processing apparatus 10c.

The virtual environment VM1 and the virtual environment VM2 equalized respectively onto the second information processing apparatus 10b and the third information processing apparatus 10c are in the standby state in case the first information processing apparatus 10a goes down. At this time, only the equalization process is executed at high speed from the first information processing apparatus 10a to the second information processing apparatus 10b and the third information processing apparatus 10c.

Equalization from the operating virtual environments VM1, VM2 to the standby virtual environments VM1, VM2 may be executed by any appropriate method, including known techniques. While causing the operating virtual environments VM1, VM2 to operate, the redundant system 1 equalizes the differences, occurring in virtual hardware, onto each of the standby virtual environments VM1, VM2 at predetermined intervals. Unlike a known technique, the redundant system 1 according to an embodiment can thus include two or more information processing apparatuses 10 as targets of equalization.

The above redundant operations described using the first information processing apparatus 10a may be similarly adopted for the second information processing apparatus 10b and the third information processing apparatus 10c as well.

For example, the controller 13b of the second information processing apparatus 10b maintains two operating virtual environments VM3, VM4 in the operating state. In case the second information processing apparatus 10b goes down, the redundant system 1 equalizes the operating virtual environments VM3, VM4, operating on the second information processing apparatus 10b, onto the other first information processing apparatus 10a and third information processing apparatus 10c.

In greater detail, the controller 13b causes the communication interface 11b to transmit equalization information, associated with the operating virtual environments VM3, VM4 in the operating state on the respective second information processing apparatus 10b, to each of the other first information processing apparatus 10a and third information processing apparatus 10c.

The controller 13a of the first information processing apparatus 10a causes the communication interface 11a to receive, from the other second information processing apparatus 10b, the equalization information associated with the operating virtual environment VM3 in the operating state on the other second information processing apparatus 10b. Based on the equalization information received by the communication interface 11a, the controller 13a equalizes the virtual environment VM3 onto the respective first information processing apparatus 10a.

Similarly, the controller 13c of the third information processing apparatus 10c causes the communication interface 11c to receive, from the other second information processing apparatus 10b, the equalization information associated with the operating virtual environment VM4 in the operating state on the other second information processing apparatus 10b. Based on the equalization information received by the communication interface 11c, the controller 13c equalizes the virtual environment VM4 onto the respective third information processing apparatus 10c.

The virtual environment VM3 and the virtual environment VM4 equalized respectively onto the first information processing apparatus 10a and the third information processing apparatus 10c are in the standby state in case the second information processing apparatus 10b goes down.

For example, the controller 13c of the third information processing apparatus 10c maintains two operating virtual environments VM5, VM6 in the operating state. In case the third information processing apparatus 10c goes down, the redundant system 1 equalizes the operating virtual environments VM5, VM6, operating on the third information processing apparatus 10c, onto the other second information processing apparatus 10b and first information processing apparatus 10a.

In greater detail, the controller 13c causes the communication interface 11c to transmit equalization information, associated with the operating virtual environments VM5, VM6 in the operating state on the respective third information processing apparatus 10c, to each of the other second information processing apparatus 10b and first information processing apparatus 10a.

The controller 13b of the second information processing apparatus 10b causes the communication interface 11b to receive, from the other third information processing apparatus 10c, the equalization information associated with the operating virtual environment VM5 in the operating state on the third information processing apparatus 10c. Based on the equalization information received by the communication interface 11b, the controller 13b equalizes the virtual environment VM5 onto the respective second information processing apparatus 10b.

Similarly, the controller 13a of the first information processing apparatus 10a causes the communication interface 11a to receive, from the other third information processing apparatus 10c, the equalization information associated with the operating virtual environment VM6 in the operating state on the other third information processing apparatus 10c. Based on the equalization information received by the communication interface 11a, the controller 13a equalizes the virtual environment VM6 onto the respective first information processing apparatus 10a.

The virtual environment VM5 and the virtual environment VM6 equalized respectively onto the second information processing apparatus 10b and the first information processing apparatus 10a are in the standby state in case the third information processing apparatus 10c goes down.

In this way, the controller 13a maintains the virtual environments VM1, VM2 in the operating state and sets the virtual environments VM3, VM6 to the standby state. The controller 13b maintains the virtual environments VM3, VM4 in the operating state and sets the virtual environments VM1, VM5 to the standby state. The controller 13c maintains the virtual environments VM5, VM6 in the operating state and sets the virtual environments VM2, VM4 to the standby state.

Figure 3:
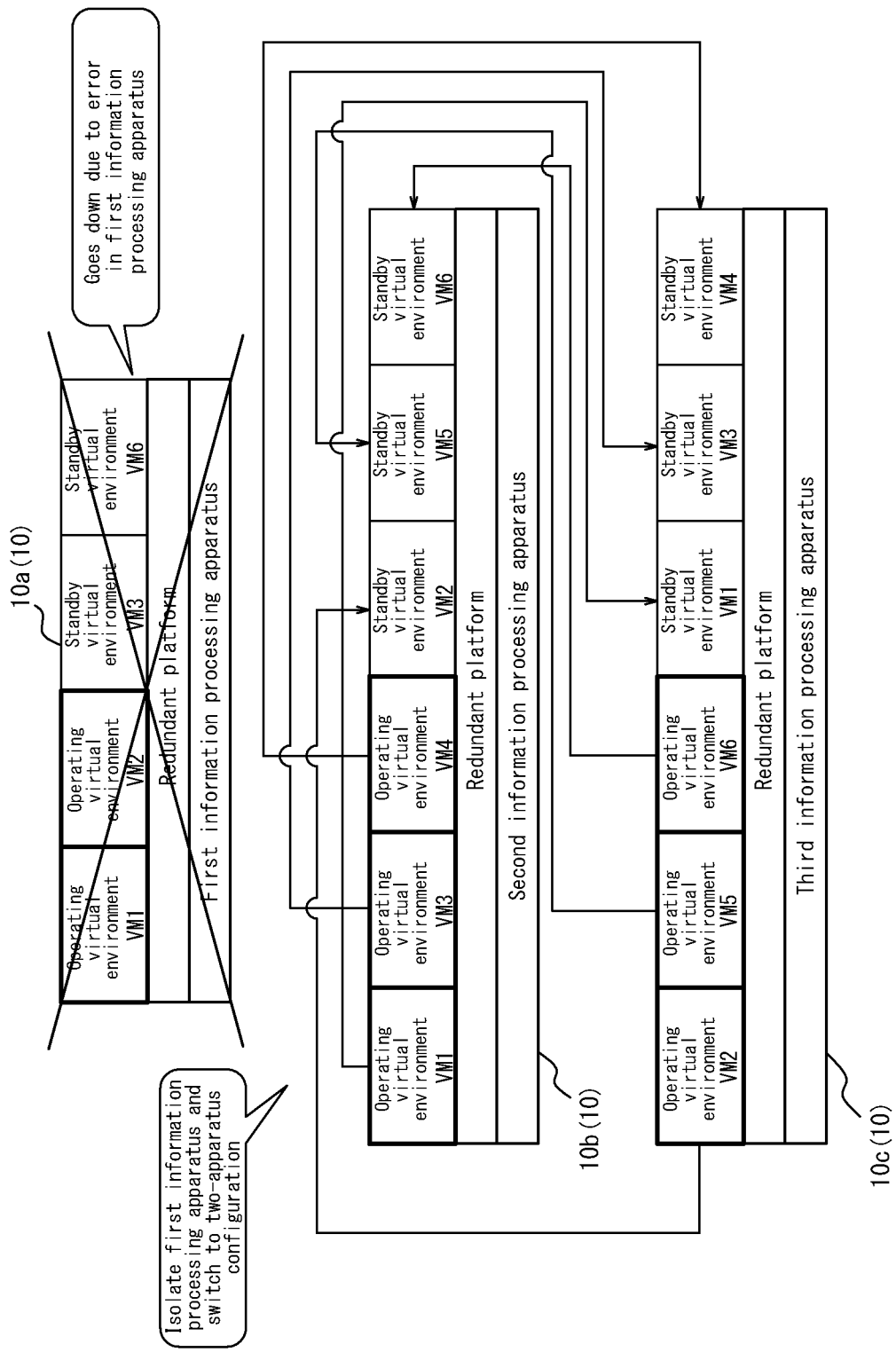
FIG. 3 schematically illustrates operations of the redundant system when, as an example, the first information processing apparatus of FIG. 2 goes down.

FIG. 3 schematically illustrates operations of the redundant system 1 when, as an example, the first information processing apparatus 10a of FIG. 2 goes down. Switching operations when the first information processing apparatus 10a goes down are mainly described with reference to FIG. 3. The operations described below may be similarly adopted when the second information processing apparatus 10b and the third information processing apparatus 10c go down as well.

If the first information processing apparatus 10a, for example, goes down due to a hardware error, the controller 13b of the second information processing apparatus 10b and the controller 13c of the third information processing apparatus 10c judge that the first information processing apparatus 10a has gone down. The controller 13b and the controller 13c switch the virtual environments VM1, VM2, which were in the operating state on the first information processing apparatus 10a, from the standby state to the operating state on the respective information processing apparatuses 10 at this time. Consequently, operations of the virtual environments VM1, VM2 that were in the operating state on the first information processing apparatus 10a continue.

The first information processing apparatus 10a is isolated at this time, changing the number of information processing apparatuses 10 configuring the redundant system 1 to two. In other words, only the second information processing apparatus 10b and the third information processing apparatus 10c are in the operating state. In case the second information processing apparatus 10b or the third information processing apparatus 10c also goes down, the redundant system 1 equalizes the virtual environments between the second information processing apparatus 10b and the third information processing apparatus 10c. In greater detail, virtual environments VM2, VM6 are newly constructed on the second information processing apparatus 10b, and virtual environments VM1, VM3 are newly constructed on the third information processing apparatus 10c. The controller 13b then equalizes the operating virtual environments VM2, VM5, VM6, operating on the third information processing apparatus 10c, onto the second information processing apparatus 10b based on control similar to the control by the controller 13 during the above-described regular operations of the redundant system 1. Similarly, the controller 13c equalizes the operating virtual environments VM1, VM3, VM4, operating on the second information processing apparatus 10b, onto the third information processing apparatus 10c.

FIG. 4 schematically illustrates operations of the redundant system 1 when, as an example, the second information processing apparatus 10b of FIG. 3 also goes down. Switching operations when both the first information processing apparatus 10a and the second information processing apparatus 10b go down are mainly described with reference to FIG. 4. The operations described below may be similarly adopted when any two information processing apparatuses 10 among the three information processing apparatuses 10 go down.

If the first information processing apparatus 10a and the second information processing apparatus 10b, for example, go down due to a hardware error, the controller 13c of the third information processing apparatus 10c judges that the first information processing apparatus 10a and the second information processing apparatus 10b are down. The controller 13c switches the virtual environments VM1, VM3, VM4, which were in the operating state on the second information processing apparatus 10b, from the standby state to the operating state on the respective third information processing apparatus 10c at this time. Consequently, operations of the virtual environments VM1, VM3, VM4 that were in the operating state on the second information processing apparatus 10b continue.

At this time, the controller 13c runs six operating virtual environments VM1, VM2, VM3, VM4, VM5, VM6 on the third information processing apparatus 10c. The third information processing apparatus 10c in this case therefore has machine power capable of running six virtual environments.

When the second information processing apparatus 10b recovers from going down while only the third information processing apparatus 10c is running, as illustrated in FIG. 4, the redundant system 1 equalizes the operating virtual environments VM1, VM2, VM3, VM4, VM5, VM6, operating on the third information processing apparatus 10c, onto the second information processing apparatus 10b. In greater detail, the controller 13b equalizes the operating virtual environments VM1, VM2, VM3, VM4, VM5, VM6, operating on the third information processing apparatus 10c, onto the second information processing apparatus 10b based on control similar to the control by the controller 13 during the above-described regular operations of the redundant system 1. After equalization is complete, the controller 13b sets the virtual environments VM1, VM3, VM4 to the operating state and the virtual environments VM2, VM5, VM6 to the standby state, for example, as in FIG. 3. At this time, the controller 13c of the third information processing apparatus 10c switches the three operating virtual environments VM1, VM3, VM4 to the standby state. The virtual environments to be set to the operating state and the virtual environments to be switched to the standby state on the second information processing apparatus 10b and the third information processing apparatus 10c may be set freely based on the redundant management information acquired from the management information processing apparatus 20.

When the first information processing apparatus 10a also recovers from going down while the second information processing apparatus 10b and the third information processing apparatus 10c are running, as illustrated in FIG. 3, the redundant system 1 performs similar operations to return to the configuration illustrated in FIG. 2.

Figure 5:
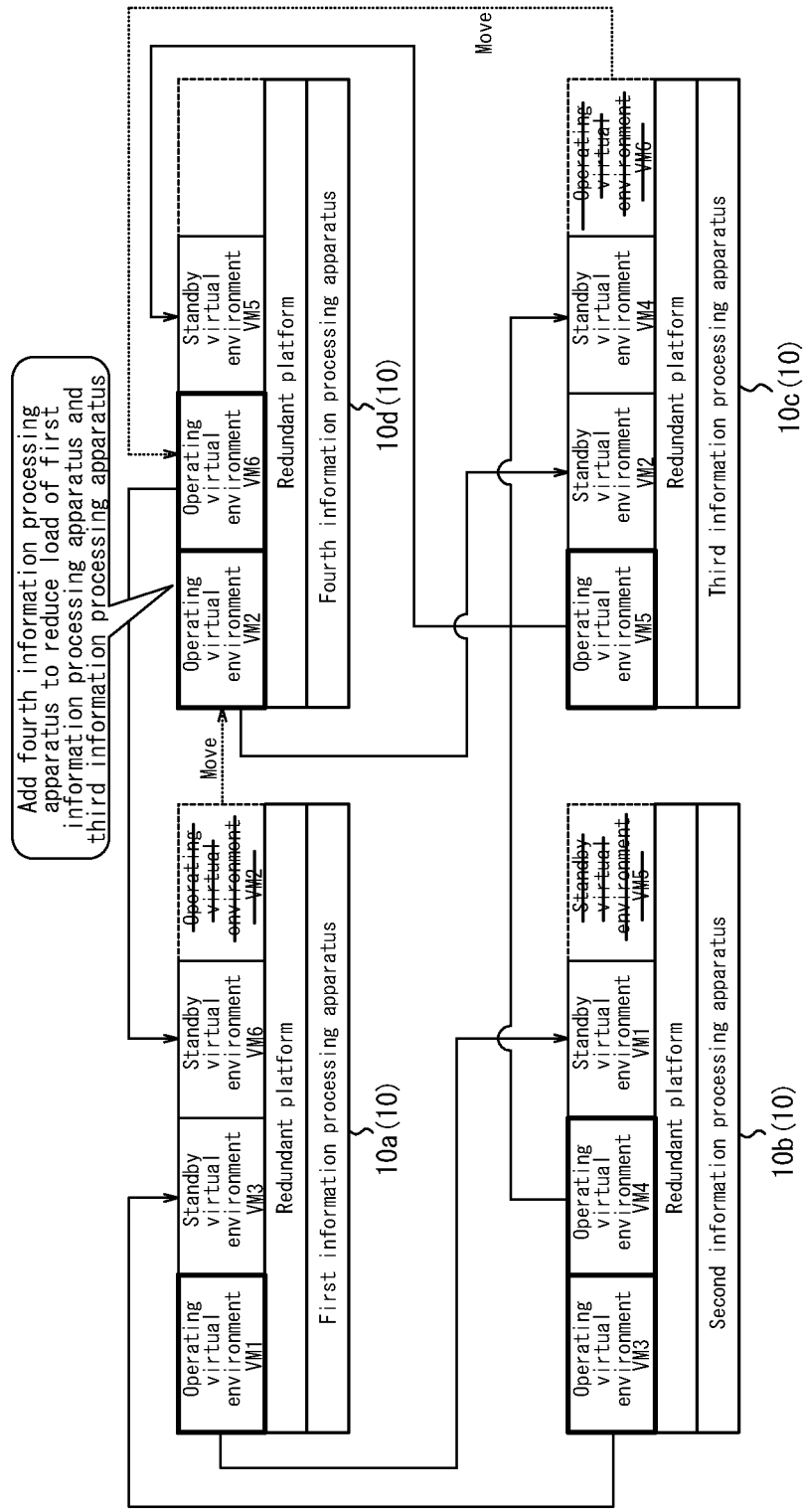
FIG. 5 schematically illustrates operations of the redundant system when, as an example, a fourth information processing apparatus is newly added to the redundant system of FIG. 2.

FIG. 5 schematically illustrates operations of the redundant system 1 when, as an example, a new fourth information processing apparatus 10d is added to the redundant system 1 of FIG. 2. Switching operations when the new fourth information processing apparatus 10d is added to the redundant system 1 are mainly described with reference to FIG. 5. FIG. 5 illustrates how operations of the redundant system 1 including three information processing apparatuses 10 is continued while the load balance is adjusted to accommodate the addition of the new fourth information processing apparatus 10d.

At this time, the management information processing apparatus 20 adds the fourth information processing apparatus 10d to the redundant management information of Table 1 based on an input operation from the user, for example. When, for example, the first information processing apparatus 10a and the third information processing apparatus 10c have insufficient performance, the management information processing apparatus 20 associates the operating virtual environment VM2 of the first information processing apparatus 10a and the operating virtual environment VM6 of the third information processing apparatus 10c with the fourth information processing apparatus 10d. The management information processing apparatus 20 then also changes the association of the standby virtual environments that are to be equalized onto the information processing apparatuses 10. For example, the management information processing apparatus 20 changes the association of the standby virtual environment VM5 from the second information processing apparatus 10b to the fourth information processing apparatus 10d. The management information processing apparatus 20 subsequently transmits the changed redundant management information to the information processing apparatuses 10.

Based on the redundant management information downloaded to the information processing apparatuses 10, the redundant system 1 equalizes the operating virtual environment VM2 of the first information processing apparatus 10a, and the operating virtual environment VM6 of the third information processing apparatus 10c onto the fourth information processing apparatus 10d. In greater detail, the fourth information processing apparatus 10d first constructs standby virtual environments VM2, VM6 based on the received redundant management information. The controller 13a judges that the new fourth information processing apparatus 10d has been provided in the redundant system 1 and causes the communication interface 11a to transmit equalization information associated with the virtual environment VM2 in the operating state on the first information processing apparatus 10a to the fourth information processing apparatus 10d. Similarly, the controller 13c judges that the new fourth information processing apparatus 10d has been provided in the redundant system 1 and causes the communication interface 11c to transmit equalization information associated with the virtual environment VM6 in the operating state on the third information processing apparatus 10c to the fourth information processing apparatus 10d. Based on the equalization information received from the communication interface 11a and the communication interface 11c, the fourth information processing apparatus 10d equalizes the corresponding operating virtual environments onto the standby virtual environments VM2, VM6 of the fourth information processing apparatus 10d.

The controller 13a then switches the virtual environment VM2 in the operating state on the first information processing apparatus 10a to the standby state. Similarly, the controller 13c switches the virtual environment VM6 in the operating state on the third information processing apparatus 10c to the standby state. On the other hand, the fourth information processing apparatus 10d switches the equalized standby virtual environments VM2, VM6 to the operating state. The fourth information processing apparatus 10d transmits equalization information associated with the operating virtual environments VM2, VM6 to each of the third information processing apparatus 10c and the first information processing apparatus 10a. Based on the received equalization information, the controller 13a equalizes the operating virtual environment VM6 of the fourth information processing apparatus 10d as a standby virtual environment VM6. Based on the received equalization information, the controller 13c equalizes the operating virtual environment VM2 of the fourth information processing apparatus 10d as a standby virtual environment VM2.

Additionally, the controller 13c causes the communication interface 11c to transmit equalization information associated with the virtual environment VM5 in the operating state on the third information processing apparatus 10c to the fourth information processing apparatus 10d. The fourth information processing apparatus 10d sets the equalized virtual environment VM5 to the standby state.

The controller 13 deletes the virtual environment associated with the equalization information transmitted by the communication interface 11 from the respective information processing apparatus 10. In greater detail, the controller 13a deletes the virtual environment VM2 switched from the operating state to the standby state by the above-described steps. The controller 13c deletes the virtual environment VM6 switched from the operating state to the standby state by the above-described steps. Additionally, the redundant system 1 changes the standby virtual environments of the information processing apparatus as illustrated in FIG. 5 based on the redundant management information. For example, the controller 13b deletes the standby virtual environment VM5. The redundant system 1 can, in this way, flexibly change the system scale, reducing the load of the information processing apparatuses 10 and boosting system performance.

Figure 6:
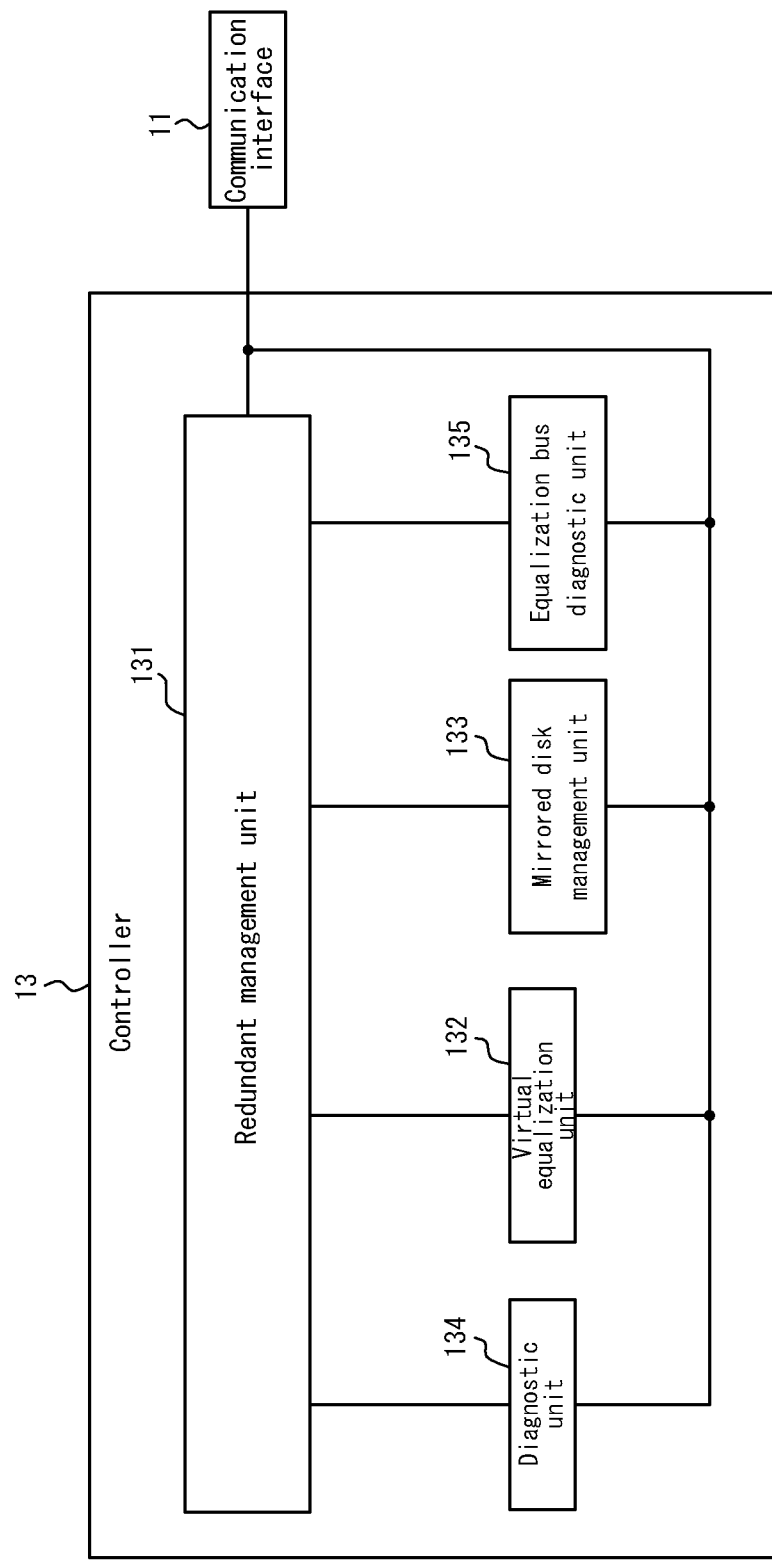
FIG. 6 is a functional block diagram illustrating the functions of the controller in FIG. 1 in greater detail.

FIG. 6 is a functional block diagram illustrating the functions of the controller 13 of FIG. 1 in greater detail. The functions of the controller 13 are described in greater detail with reference to FIG. 6. The controller 13 includes a redundant management unit 131, a virtual equalization unit 132, a mirrored disk management unit 133, a diagnostic unit 134, and an equalization bus diagnostic unit 135, for example.

The redundant management unit 131 manages the state of the redundant platform. Based on the redundant management information downloaded from the management information processing apparatus 20, the redundant management unit 131 controls the operating virtual environments and standby virtual environments and manages communication for equalization onto other information processing apparatuses 10. The redundant management unit 131 maintains predetermined virtual environments in the operating state and sets other virtual environments to the standby state during the regular operations of FIG. 2, for example. When, for example, judging that another information processing apparatus 10 has gone down, the redundant management unit 131 switches the standby virtual environments on the respective information processing apparatus 10 to the operating state. At this time, the redundant management unit 131 instructs the virtual equalization unit 132 to isolate the information processing apparatus 10 that went down. Similarly, the redundant management unit 131 instructs the mirrored disk management unit 133, via the virtual equalization unit 132, to isolate the information processing apparatus 10 that went down. Additionally, the redundant management unit 131 instructs the virtual equalization unit 132 and the mirrored disk management unit 133 to perform equalization.

When judging that a new information processing apparatus 10 has been provided in the redundant system 1, the redundant management unit 131 instructs the virtual equalization unit 132 to transmit equalization information associated with a virtual environment in the operating state to the new information processing apparatus 10 using the communication interface 11. The redundant management unit 131 deletes the virtual environment associated with the equalization information transmitted by the communication interface 11 from the respective information processing apparatus 10.

The virtual equalization unit 132 provides a virtual hardware environment to the guest OS. The virtual equalization unit 132 monitors the changes to virtual hardware, including memory, devices, and the like, at predetermined intervals. The virtual equalization unit 132 uses the communication interface 11 to transmit the differences to another information processing apparatus 10 as equalization information. The equalization information is, for example, transmitted to the virtual equalization unit 132 of the other information processing apparatus 10 in a redundant configuration using the inter-pair communication function of the communication interface 11. Based on received equalization information, the virtual equalization unit 132 equalizes the corresponding virtual environment onto the respective information processing apparatus 10. In this way, redundant operations with another information processing apparatus 10 are achieved.

The mirrored disk management unit 133 mirrors auxiliary memory, based on the HDD associated with each virtual environment, between an operating virtual environment and a standby virtual environment. Always setting the HDD to match between a corresponding operating virtual environment and standby virtual environment on different information processing apparatuses 10 allows the content of the HDD to be inherited in the redundant system 1 after switching.

The diagnostic unit 134 diagnoses the respective information processing apparatus 10. The diagnostic unit 134 is also notified of errors detected by other functional units. The diagnostic unit 134 categorizes errors by level and notifies the redundant management unit 131.

The equalization bus diagnostic unit 135 diagnoses the equalization bus that connects information processing apparatuses 10. The equalization bus is required to be reliable and is therefore configured by a redundant network, for example. The equalization bus diagnostic unit 135 performs diagnosis at high speed, and when detecting an error on one equalization bus, switches to the other bus. The equalization bus diagnostic unit 135 also diagnoses the paired information processing apparatus 10, and when detecting that the paired information processing apparatus 10 has gone down, notifies the diagnostic unit 134 of the error. The redundant management unit 131 then performs the above-described switching processing.

Figure 7:
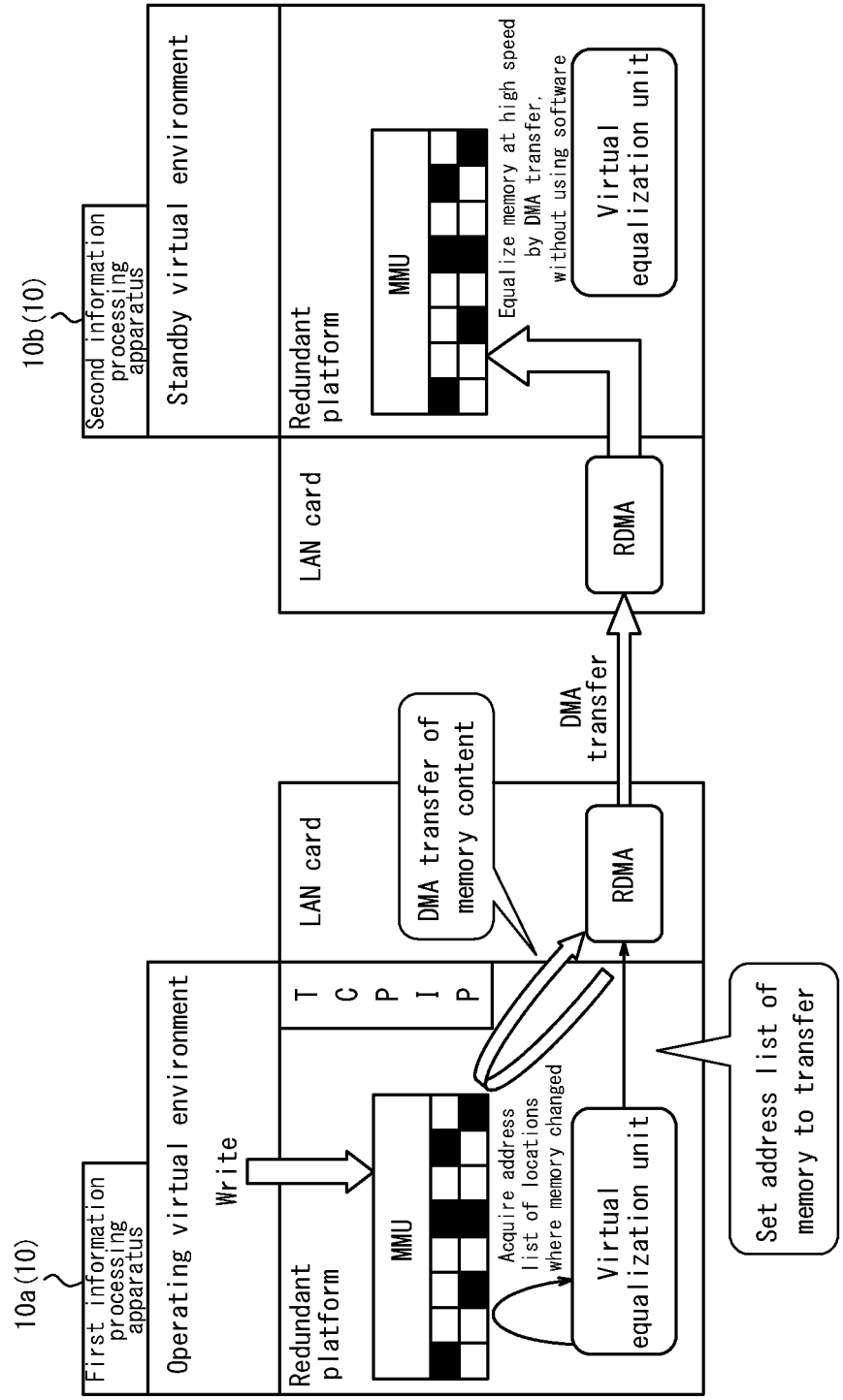
FIG. 7 schematically illustrates a method of speeding up an equalization process.

FIG. 7 schematically illustrates a method of speeding up the equalization process. The method of speeding up the equalization process in the redundant system 1 is mainly described with reference to FIG. 7. An example of the first information processing apparatus 10a, and the second information processing apparatus 10b is illustrated in FIG. 7, but a similar description may be adopted for any other combination of information processing apparatuses 10.

The redundant system 1 needs to equalize the differences in the virtual environment at high speed from an operating virtual environment to the corresponding standby virtual environment. As the operating virtual environment runs, the state of the virtual environment changes, and write accesses to the memory area of the virtual environment managed by the redundant platform occur. The content of memory consequently changes.

Known redundancy using a software method performs such an equalization process with software. This leads to the problems of high overhead and of a degradation in performance for a single system. For example, when using a software method, the virtual equalization unit 132 of the first information processing apparatus 10a that monitors the operating virtual environment detects a difference in the memory content and transfers the memory difference to the virtual equalization unit 132 of the second information processing apparatus 10b. The virtual equalization unit 132 of the second information processing apparatus 10b performs equalization based on the transferred information. In this case, the two processes below occur for the software of the virtual equalization unit 132 to transfer the above-described memory difference. One process is to copy dirty pages of the memory that a memory management unit (MMU) manages by pages, i.e. to copy the content of the pages for which a write access occurred, to the respective transfer buffer. The other process is to transfer the content of the transfer buffer to the second information processing apparatus 10b by TCPIP. In this process as well, memory buffer copying occurs within the communication driver, for example. A large amount of CPU power is therefore used for the process to transfer the memory difference.

The redundant system 1 according to an embodiment may perform equalization on the second information processing apparatus 10b without the need for the above-described software-based processes. Consequently, the overhead for equalization is greatly reduced, and equalization is performed at high speed. The performance of the operating virtual environment therefore greatly improves.

The RDMA function implemented on the LAN card may be used for the equalization in the redundant system 1 according to an embodiment. In other words, the communication interface 11 may transmit and receive various information using the RDMA function implemented on the LAN card.

At this time, the virtual equalization unit 132 may refer to the dirty pages of the MMU and acquire an address list of memory pages that were written to. The virtual equalization unit 132 refers only to the addresses and not to the actual data. Hence, no memory transfer occurs.

The acquired address list may be transferred to the second information processing apparatus 10b using the RDMA function of the LAN card. The memory content of the provided address list may be transferred to the LAN card that has the RDMA function in the second information processing apparatus 10b by the RDMA function of the LAN card in the first information processing apparatus 10a, without using software.

The controller 13b may control the communication interface 11b so that, using the RDMA function of the second information processing apparatus 10b, the transferred data is copied to the designated memory address, equalizing the memory content between the first information processing apparatus 10a and the second information processing apparatus 10b.

Figure 8:
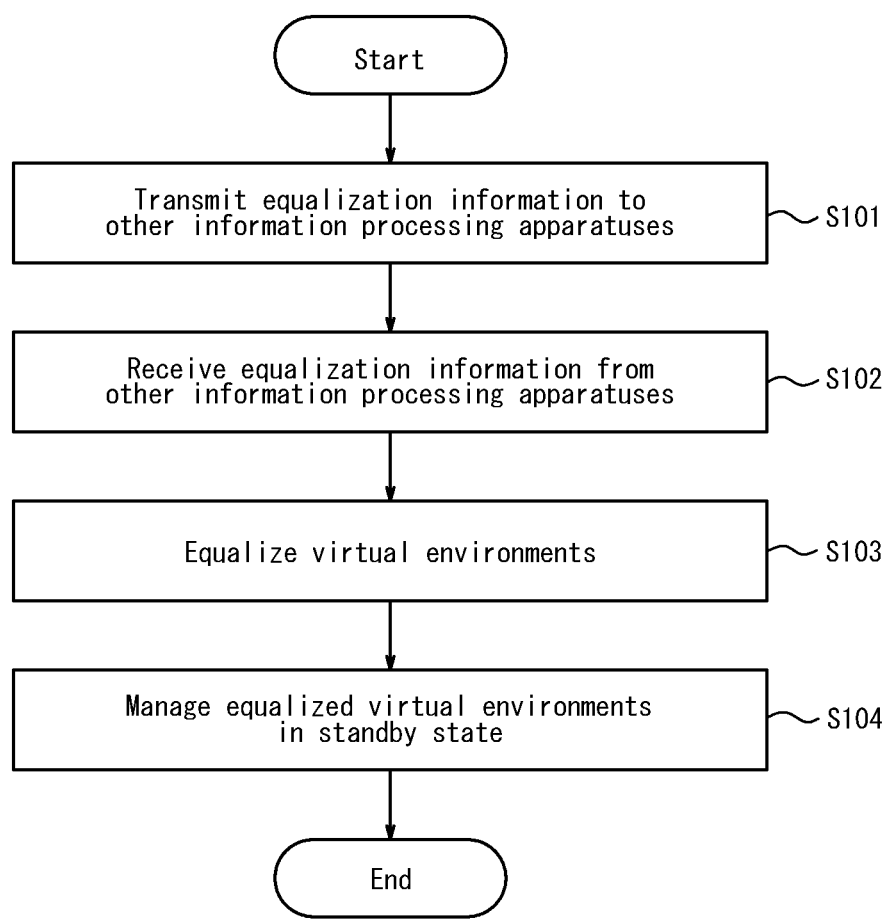
FIG. 8 is a flowchart illustrating a first example of operations of the redundant system of FIG. 2.

FIG. 8 is a flowchart illustrating a first example of operations of the redundant system 1 of FIG. 2. In FIG. 8, regular operations of the redundant system 1 are illustrated focusing only on the controller 13 of one information processing apparatus 10. The flow of regular operations of the redundant system 1 is mainly described with reference to FIG. 8.

In step S101, the controller 13 in each of the three information processing apparatuses 10 transmits the equalization information associated with the operating virtual environments in the operating state to the other information processing apparatuses 10.

In step S102, the controller 13 receives the equalization information associated with the operating virtual environments in the operating state on the other information processing apparatuses 10 from the other information processing apparatuses 10.

In step S103, the controller 13 equalizes the operating virtual environments on the other information processing apparatuses 10 onto the respective information processing apparatus 10 based on the equalization information received in step S102.

In step S104, the controller 13 maintains the operating virtual environments in the operating state and sets the equalized virtual environments to the standby state on the respective information processing apparatus 10.

Figure 9:
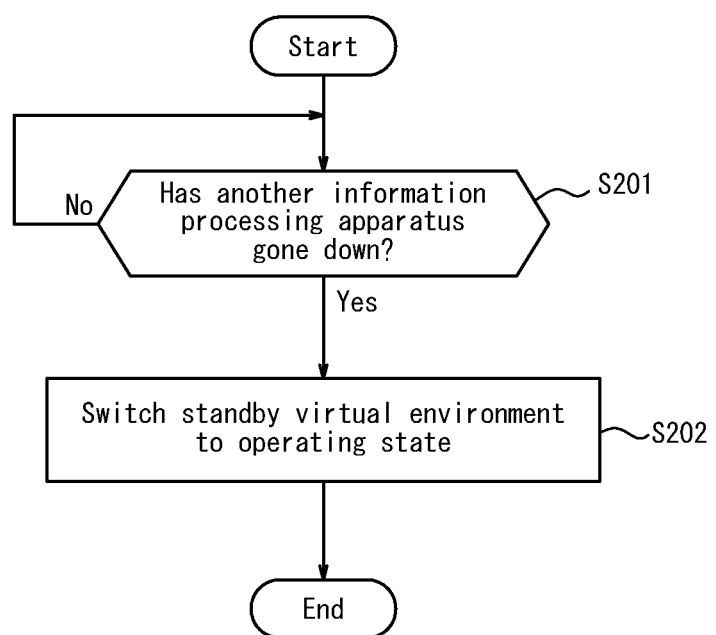
FIG. 9 is a flowchart illustrating a second example of operations of the redundant system of FIG. 2.

FIG. 9 is a flowchart illustrating a second example of operations of the redundant system 1 of FIG. 2. In FIG. 9, operations of the redundant system 1 are illustrated focusing only on the controller 13 of one information processing apparatus 10. Switching operations when one of the information processing apparatuses 10 in the redundant system 1 goes down are mainly described with reference to FIG. 9.

In step S201, the controller 13 judges whether another information processing apparatus 10 has gone down. When the controller 13 judges that another information processing apparatus 10 has gone down, the process proceeds to step S202. When the controller 13 judges that another information processing apparatus 10 has not gone down, the process returns to step S201.

In step S202, the controller 13 switches the standby virtual environment corresponding to the virtual environment in the operating state on the other information processing apparatus 10, which was judged to have gone down, from the standby state to the operating state on the respective information processing apparatus 10.

Figure 10:
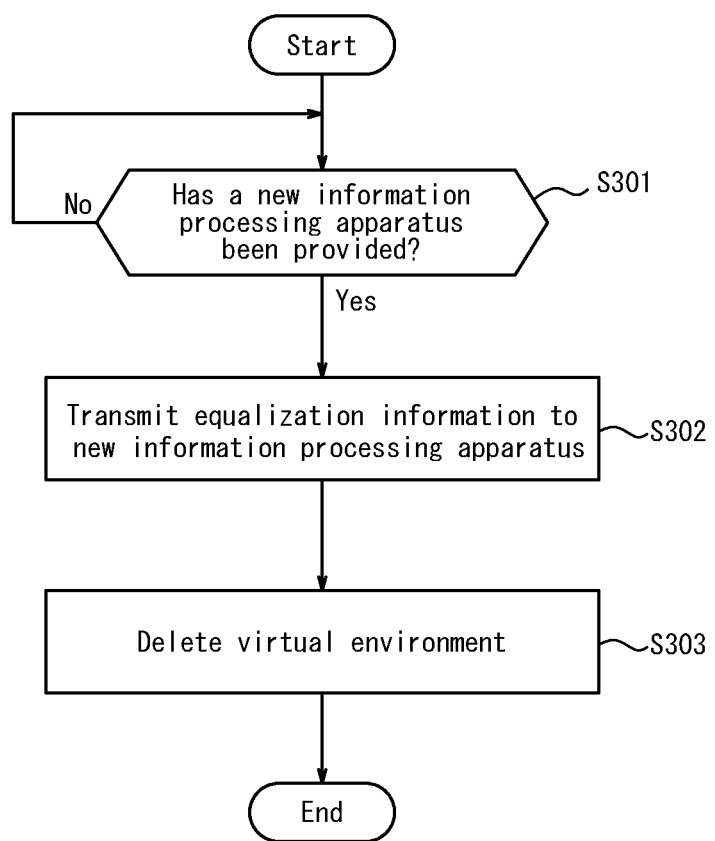
FIG. 10 is a flowchart illustrating a third example of operations of the redundant system of FIG. 2.

FIG. 10 is a flowchart illustrating a third example of operations of the redundant system 1 of FIG. 2. In FIG. 10, operations of the redundant system 1 are illustrated focusing only on the controller 13 of one information processing apparatus 10. Switching operations when the new fourth information processing apparatus 10d is added to the redundant system 1 are mainly described with reference to FIG. 10.

In step S301, the controller 13 judges whether a new fourth information processing apparatus 10d has been provided in the redundant system 1. When the controller 13 judges that the fourth information processing apparatus 10d has been provided in the redundant system 1, the process proceeds to step S302. When the controller 13 judges that the fourth information processing apparatus 10d has not been provided in the redundant system 1, the process returns to step S301.

In step S302, the controller 13 transmits equalization information associated with an operating virtual environment in the operating state on the respective information processing apparatus 10 to the new fourth information processing apparatus 10d judged to have been provided in the redundant system 1.

In step S303, the controller 13 deletes the operating virtual environment associated with the equalization information transmitted in step S302 from the respective information processing apparatus 10.

The redundant system 1 according to the above-described embodiment can flexibly change the system scale, improving reliability and availability.

In greater detail, the system configuration can be changed without suspending system operations in the redundant system 1, as described with reference to FIG. 5. To further improve the availability of the system, and to further improve system performance, an information processing apparatus 10 may be added while the system is operating, thereby dispersing the load and improving reliability and availability. The redundant system 1 can thus sustainably expand.

By the management information processing apparatus 20 in the redundant system 1 changing the redundant management information of Table 1 based on an input operation from a user, for example, the configuration of the information processing apparatuses 10 included in the redundant system 1, the association with the virtual environments for each information processing apparatus 10, and the association with the operating state or the standby state for the virtual environments on each information processing apparatus 10 can be adjusted freely. Accordingly, the configuration can be freely changed in the redundant system 1 without suspending operations. Such free configuration changes can improve the availability and change the load balance without suspending operations.

Unlike a known dual system configured by two information processing apparatuses, the redundant system 1 according to an embodiment can also construct a system including three or more information processing apparatuses 10 in accordance with costs and with the importance of the reliability and availability required for the system. When a system including three or more information processing apparatuses 10 is constructed, system operations can continue without any effect whatsoever even if two or more information processing apparatuses 10 go down due to a hardware error, for example. The availability of the system therefore improves dramatically.

When the number of running virtual environments is one, for example, in a known redundant system that includes a dual system, the aggregation rate is 50%. On the redundant system 1 according to an embodiment, however, software and one or more virtual environments can run on all of the information processing apparatuses 10 that contribute to redundancy. The aggregation rate is therefore 100% or greater. Consequently, improvement of the aggregation rate can be made compatible with improvement of availability, improving the cost performance.

Although the present disclosure is based on drawings and embodiments, it is to be noted that various changes and modifications will be apparent to those skilled in the art based on the present disclosure. Therefore, such changes and modifications are to be understood as included within the scope of the present disclosure. For example, the functions and the like included in the various units and steps may be reordered in any logically consistent way. Units and steps may also be combined into one or divided.

For example, the present disclosure can also be implemented as a program with a description of processing to implement the above-described functions of the redundant system 1 or as a storage medium on which the program is recorded. Such embodiments are also to be understood as being within the scope of the present disclosure.

The RDMA function implemented on the LAN card has been described as being usable for equalization in the redundant system 1, but the equalization method is not limited to this example. Any appropriate method may be used. For example, the equalization method in the redundant system 1 may include a known method based on redundancy using a software method.

On each information processing apparatus 10 as described above, the operating virtual environments and the standby virtual environments each include two virtual environments, but any number of virtual environments may be included. For example, on each information processing apparatus 10, the operating virtual environment may include one virtual environment, and the standby virtual environment may include one virtual environment that is in the operating state on another information processing apparatus 10. For example, on each information processing apparatus 10, the operating virtual environment may include one virtual environment, and the standby virtual environments may include two virtual environments that are in the operating state respectively on two other information processing apparatuses 10. In this case, one operating virtual environment of each information processing apparatus 10 is equalized onto two other information processing apparatuses 10. The reliability and availability are therefore even better than when the operating virtual environment is equalized onto only one other information processing apparatus 10.

Two operating virtual environments on each information processing apparatus 10 have been described as being equalized onto different information processing apparatuses 10, but the equalization method is not limited to this example. For example, the two operating virtual environments on each information processing apparatus 10 may be equalized onto the same other information processing apparatus 10.

The redundant system 1 has been described as including three information processing apparatuses 10, but the number of information processing apparatuses 10 included in the redundant system 1 is not limited to this example. The number of information processing apparatuses 10 included in the redundant system 1 may be two, or the number may be four or more. Even when the number of information processing apparatuses 10 is two, equalization of the operating virtual environments on each information processing apparatus 10 onto the other information processing apparatus 10 as standby virtual environments changes the load balance on each information processing apparatus 10 as compared to a known dual system, in which one information processing apparatus 10 is in the operating state and the other information processing apparatus 10 is in the standby state. In other words, the load becomes substantially uniform on each information processing apparatus 10, improving the load balance.

As illustrated in FIG. 2, FIG. 5, and the like, the same number of virtual environments have been described as being constructed on each of the information processing apparatuses 10 configuring the redundant system 1, but the relationship between the number of virtual environments on each information processing apparatus 10 is not limited to this case. When the machine power of each information processing apparatus 10 differs, for example, the number of virtual environments constructed on each information processing apparatus 10 may differ in accordance with the machine power of each information processing apparatus 10. The number of virtual environments constructed on such information processing apparatuses 10 may be included in the redundant management information defined by the management information processing apparatus 20.

The redundant system 1 according to an embodiment can be adapted to computer systems in general to achieve high reliability and high availability. Implementation as a software platform allows the redundant system 1 according to an embodiment to be adapted to various software for which high reliability and high availability are required. For example, the redundant system 1 according to an embodiment is applicable to server software that runs on the controller of a process control system and on a PC platform. In greater detail, the redundant system 1 according to an embodiment is applicable to a SCADA system in a process control system, a plant information management system, a communication gateway system including an OPC server or the like, and a driving efficiency support system. For example, the redundant system 1 according to an embodiment is applicable to computer systems in general in which continuous operation is crucial, such as IT systems.

The invention claimed is:

1. A redundant system comprising:
a plurality of information processing apparatuses including at least a first information processing apparatus and a second information processing apparatus;
wherein each of the plurality of information processing apparatuses comprises:
a memory;
one or more processors; and
a communication interface configured to communicate with another information processing apparatus,
wherein the one or more processors in conjunction with the memory implement a controller configured to manage a plurality of virtual environments capable of running on the respective information processing apparatus;
wherein the communication interface of the first information processing apparatus is configured to:
transmit, to the second information processing apparatus, first equalization information associated with a first environment, among the plurality of virtual environments on the first information processing apparatus, that is in an operating state; and
receive, from the second information processing apparatus, second equalization information associated with a second environment in the operating state on the second information processing apparatus;
wherein the controller of the first information processing apparatus is configured to:
equalize the second environment onto the first information processing apparatus based on the second equalization information received by the communication interface of the first information processing apparatus; and
maintain the first environment in the operating state on the first information processing apparatus and set the second environment to a standby state on the first information processing apparatus,
wherein the first equalization information and the second virtualization information include differences in virtual hardware due to the plurality of virtual environments being in the operating state.

2. The redundant system of claim 1,
wherein the plurality of information processing apparatuses further includes a third information processing apparatus;
wherein the communication interface of the first information processing apparatus is configured to at least:
transmit, to the third information processing apparatus, third equalization information associated with a third environment, among the plurality of virtual environments on the first information processing apparatus, that is in an operating state; and
receive, from the third information processing apparatus, fourth equalization information associated with a fourth environment in the operating state on the third information processing apparatus;
wherein the controller of the first information processing apparatus is configured to:
equalize the fourth environment onto the first information processing apparatus based on the fourth equalization information received by the communication interface of the first information processing apparatus; and
maintain the third environment in the operating state and set the fourth environment to a standby state.

3. The redundant system of claim 1, wherein when the controller of the second information processing apparatus determines that the first information processing apparatus is down, the controller of the second information processing apparatus is configured to switch the first environment that was in the operating state on the first information processing apparatus from the standby state to the operating state on the second information processing apparatus.

4. The redundant system of claim 1,
wherein when the controller of the first information processing apparatus determines that a fourth information processing apparatus is added to the redundant system, the controller of the first information processing apparatus is configured to transmit, to the fourth information processing apparatus using the communication interface of the first information processing apparatus, the first equalization information associated with the first environment in the operating state; and
wherein the controller of the first information processing apparatus is configured to delete the first environment associated with the transmitted first equalization information on the first information processing apparatus.

5. The redundant system of claim 1, wherein the communication interface is configured to transmit and receive information using a remote direct memory access function implemented on a LAN card.

6. A non-transitory computer readable medium storing computer program instructions, which when executed by a plurality of information processing apparatuses included in a redundant system, cause the plurality of information processing apparatuses including at least a first information processing apparatus and a second information processing apparatus to at least:
transmit first equalization information, associated with a first environment in an operating state on the first information processing apparatus, from the first information processing apparatus to the second information processing apparatus;
receive, using the first information processing apparatus, second equalization information from the second information processing apparatus, the second equalization information being associated with a second environment in the operating state on the second information processing apparatus;
equalize the second environment onto the first information processing apparatus based on the received second equalization information; and
maintain the first environment in the operating state on the first information processing apparatus and setting the second environment to a standby state on the first information processing apparatus on the first information processing apparatus,
wherein the first equalization information and the second virtualization information include differences in virtual hardware due to the plurality of virtual environments being in the operating state.

7. The non-transitory computer readable medium of claim 6, further storing computer program instructions, which cause the plurality of information processing apparatuses further including a third information processing apparatus to at least:
    transmit third equalization information, associated with a third environment in an operating state on the first information processing apparatus, from the first information processing apparatus to the third information processing apparatus;
    receive, using the first information processing apparatus, fourth equalization information from the third information processing apparatus, the fourth equalization information being associated with a fourth environment in the operating state on the third information processing apparatus;
    equalize the fourth environment onto the first information processing apparatus based on the received fourth equalization information; and
    maintain the third environment in the operating state and setting the fourth environment to a standby state on the first information processing apparatus.

8. The non-transitory computer readable medium of claim 6, storing including computer program instructions, which cause the plurality of information processing apparatuses to at least:
    determine, using the second information processing apparatus, whether the first information processing apparatus is down; and
    switch, when the second information processing apparatus determines that the first information processing apparatus is down, the first environment that was in the operating state on the first information processing apparatus from the standby state to the operating state on the second information processing apparatus.

9. The non-transitory computer readable medium of claim 6, further storing computer program instructions, which cause the plurality of information processing apparatuses to at least:
    determine, using the first information processing apparatus, whether a fourth information processing apparatus is added to the redundant system;
    transmit, using the first information processing apparatus, when the first information processing apparatus determines that the fourth information processing apparatus is added, the first equalization information associated with the first environment in the operating state on the first information processing apparatus to the fourth information processing apparatus; and
    delete, using the first information processing apparatus, the first environment associated with the transmitted first equalization information from the first information processing apparatus.

10. The non-transitory computer readable medium of claim 6, wherein information is transmitted and received using a remote direct memory access function implemented on a LAN card.

11. A first information processing apparatus among a plurality of information processing apparatuses configuring a redundant system, the first information processing apparatus comprising:
    a memory;
    one or more processors; and
    a communication interface configured to communicate with a second information processing apparatus different from the first information processing apparatus; and,
    wherein the one or more processors in conjunction with the memory implement a controller configured to manage a plurality of virtual environments capable of running on the first information processing apparatus;
    wherein the communication interface is configured to at least:
        transmit, to the second information processing apparatus, first equalization information associated with a first environment, among the plurality of virtual environments on the first information processing apparatus, that is in an operating state; and
        receive, from the second information processing apparatus, second equalization information associated with a second environment in the operating state on the second information processing apparatus;
    wherein the controller is configured to at least:
        equalize the second environment onto the first information processing apparatus based on the second equalization information received by the communication interface; and
        maintain the first environment in the operating state on the first information processing apparatus and set the second environment to a standby state on the first information processing apparatus,
    wherein the first equalization information and the second virtualization information include differences in virtual hardware due to the plurality of virtual environments being in the operating state.

* * * * *